US009395217B1

(12) United States Patent
Gaor

(10) Patent No.: US 9,395,217 B1
(45) Date of Patent: Jul. 19, 2016

(54) VEHICLE LOCATION ASSISTING DEVICE

(71) Applicant: Paul C. Gaor, Delray Beach, FL (US)

(72) Inventor: Paul C. Gaor, Delray Beach, FL (US)

( * ) Notice: Subject to any disclaimer, the term of this patent is extended or adjusted under 35 U.S.C. 154(b) by 299 days.

(21) Appl. No.: 14/160,714

(22) Filed: Jan. 22, 2014

(51) Int. Cl.
*G01D 13/00* (2006.01)

(52) U.S. Cl.
CPC .................................... *G01D 13/00* (2013.01)

(58) Field of Classification Search
CPC .................................................... G01D 13/00
See application file for complete search history.

(56) References Cited

U.S. PATENT DOCUMENTS

| | | | | |
|---|---|---|---|---|
| 3,148,856 A | | 9/1964 | Orlando | |
| 3,241,516 A | | 3/1966 | Hopkins | |
| 3,955,786 A | * | 5/1976 | Duddy | B60R 13/00 248/537 |
| 4,574,726 A | * | 3/1986 | Sullivan | B60R 13/005 116/174 |
| 4,575,726 A | | 3/1986 | Gounder | |
| 4,964,360 A | | 10/1990 | Henry | |
| 5,388,546 A | | 2/1995 | Lombard | |
| D359,726 S | | 6/1995 | Umeya et al. | |
| D359,924 S | | 7/1995 | Grumbeck | |
| 6,129,035 A | * | 10/2000 | Schweinberger | B60Q 1/482 116/173 |
| 6,213,440 B1 | * | 4/2001 | Kornback | B60R 13/005 248/206.5 |
| 6,298,803 B1 | | 10/2001 | Gregg | |
| 6,378,453 B1 | | 4/2002 | Conway | |
| 7,385,526 B1 | | 6/2008 | Bullard et al. | |

* cited by examiner

*Primary Examiner* — David V Bruce

(57) ABSTRACT

A vehicle location assisting device attaches to a top surface of a vehicle to assist a user in identifying the location of the vehicle. The device includes a base configured for positioning on a top surface of a vehicle. A magnet is coupled to the base. The magnet is configured to magnetically attach the base to the top surface of the vehicle. A pole has a top end and a bottom end. The bottom end of the pole is attached to the base. A panel is coupled to the pole proximate the top end of the pole.

17 Claims, 3 Drawing Sheets

VEHICLE LOCATION ASSISTING DEVICE

BACKGROUND OF THE DISCLOSURE

Field of the Disclosure

The disclosure relates to vehicle location devices and more particularly pertains to a new vehicle location device for attaching to a top surface of a vehicle to assist a user in identifying the location of the vehicle.

SUMMARY OF THE DISCLOSURE

An embodiment of the disclosure meets the needs presented above by generally comprising a base configured for positioning on a top surface of a vehicle. A magnet is coupled to the base. The magnet is configured to magnetically attach the base to the top surface of the vehicle. A pole has a top end and a bottom end. The bottom end of the pole is attached to the base. A panel is coupled to the pole proximate the top end of the pole.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
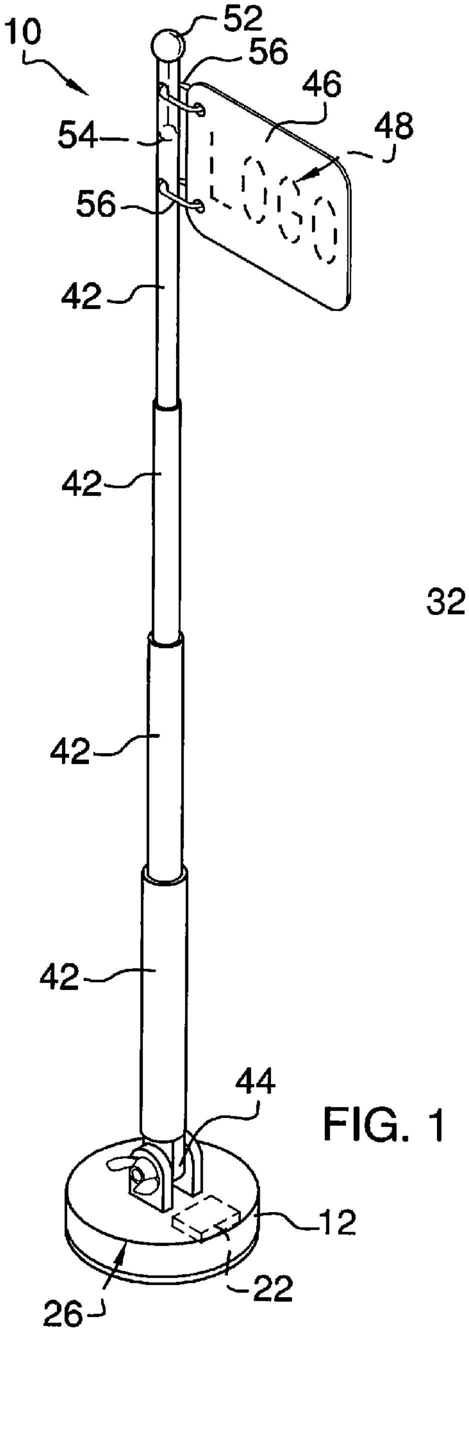
FIG. 1 is a top front side perspective view of a vehicle location assisting device according to an embodiment of the disclosure.
Figure 2:
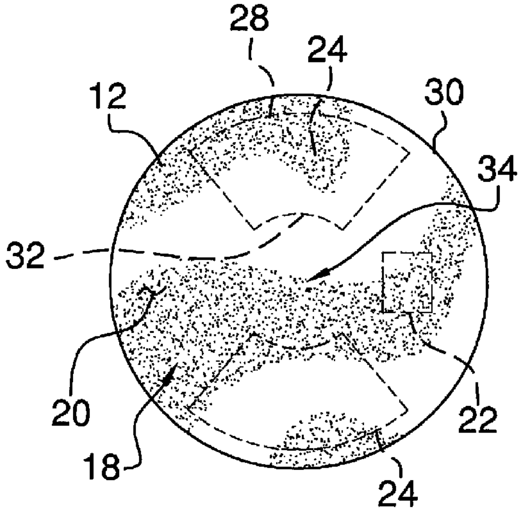
FIG. 2 is a bottom view of an embodiment of the disclosure.
Figure 3:
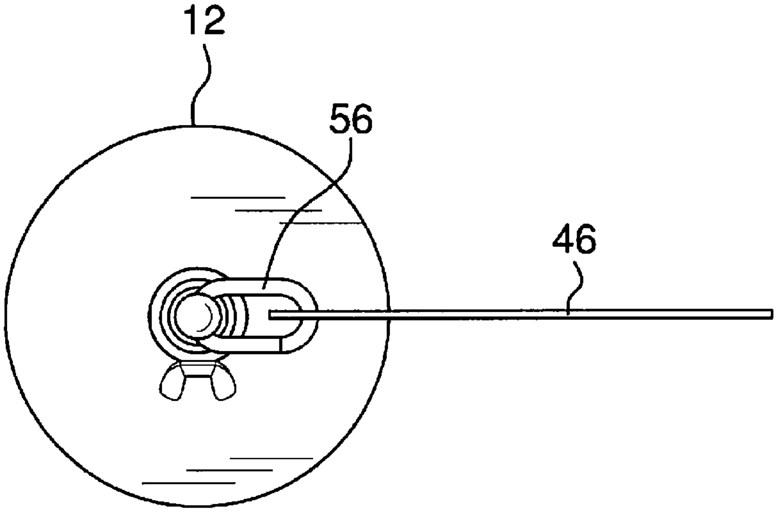
FIG. 3 is a top view of an embodiment of the disclosure.
Figure 4:
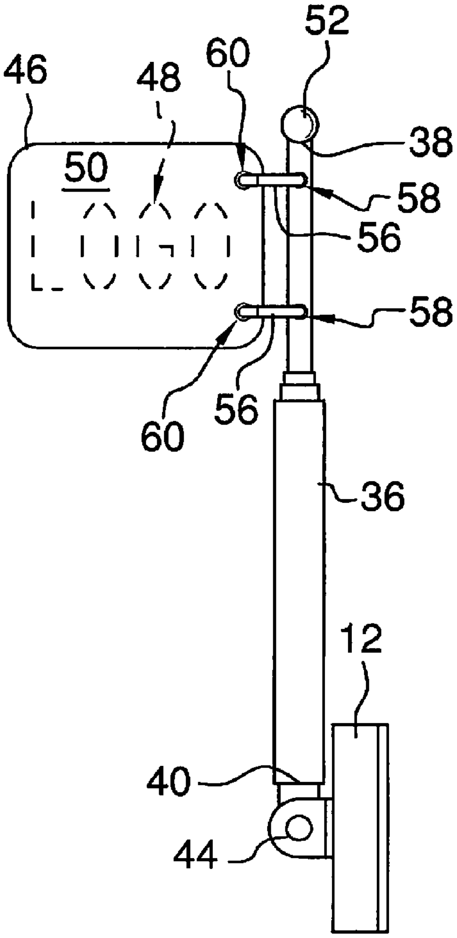
FIG. 4 is a side view of an embodiment of the disclosure.
Figure 5:
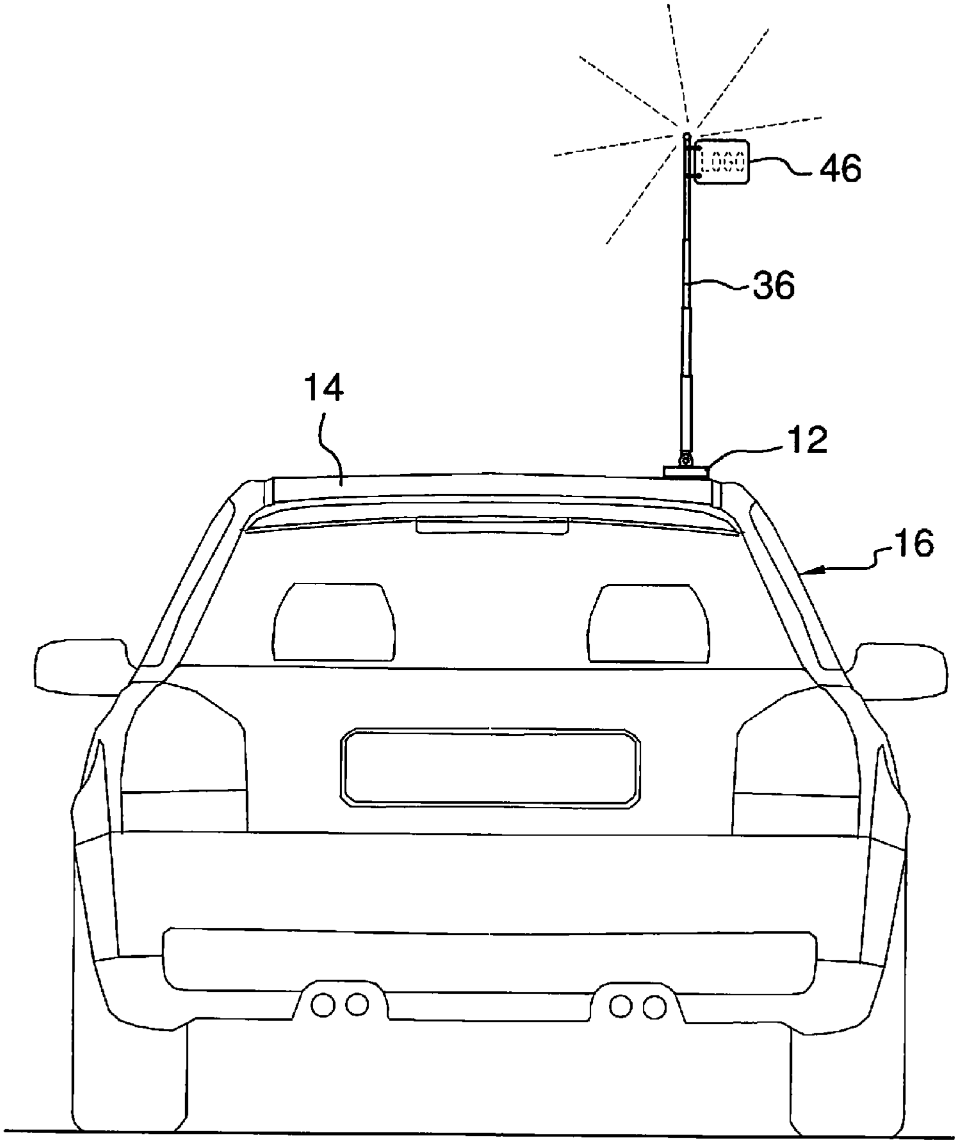
FIG. 5 is a front view of an embodiment of the disclosure in use.

With reference now to the drawings, and in particular to FIGS. 1 through 5 thereof, a new vehicle location device embodying the principles and concepts of an embodiment of the disclosure and generally designated by the reference numeral 10 will be described.

As best illustrated in FIGS. 1 through 5, the vehicle location assisting device 10 generally comprises a base 12 configured for positioning on a top surface 14 of a vehicle 16. A bottom surface 18 of the base 12 is comprised of a non-slip material 20, such as felt, rubber or the like to prevent scratching of the top surface 14 of the vehicle 16. A tracking chip 22 is coupled to the base 12 wherein a location of the vehicle 16 is determinable when the base 12 is positioned on the top surface 14 of the vehicle 16.

A magnet 24 is coupled to the base 12. The magnet 24 is configured to magnetically attach the base 12 to the top surface 14 of the vehicle 16. The magnet 24 is positioned within an interior space 26 of the base 12. The magnet 24 may be one of a plurality of magnets 24. The magnet 24 may have a convexly arcuate outer edge 28 positioned proximate a perimeter surface 30 of the base 12 and a concavely arcuate inner edge 32 positioned proximate a center 34 of the base 12.

A pole 36 has a top end 38 and a bottom end 40. The bottom end 40 of the pole 36 is attached to the base 12. The pole 36 may be comprised of a plurality of tubular sections 42 wherein each of the tubular sections 42 is slidably positionable within an adjacently positioned one of the tubular sections 42 for selectively adjusting a length of the pole 36. A swivel connection member 44 is coupled to the bottom end 40 of the pole 36. The swivel connection member 44 couples the bottom end 40 of the pole 36 to the base 12 such that the pole 36 is selectively swivelable relative to the base 12 and is done so in a conventional manner. A panel 46 is coupled to the pole 36 proximate the top end 38 of the pole 36. The panel 46 may comprise a flag that is flexible and moves with the wind. Alternatively, the panel 46 may be rigid. Indicia 48 is positioned on a front surface 50 of the panel 46 wherein the indicia 48 is configured to assist a user in identifying and locating the vehicle 16. A light emitter 52 may be coupled to the top end 38 of the pole 36 to further assist in locating the vehicle 16. A power supply 54 is coupled to the pole 36. The power supply 54 may comprise at least one rechargeable battery. The power supply 54 is electrically coupled to the light emitter 52 for providing power to the light emitter 52.

A plurality of clips 56 couples the panel 46 to the pole 36. The clips 56 releasably couple the panel 46 to the pole 36. A plurality of apertures 58 is positioned in the pole 36 and a plurality of holes 60 is positioned in the panel 46. Each of the apertures 58 corresponds to an associated one of the holes 60 such that each of the clips 56 is extendable through an associated one of the apertures 58 and an associated one of the holes 60 to retain the panel 46 on the pole 36. A distance between the base 12 and the light emitter 52 may be between approximately 120.0 cm and 180.0 cm. Each of the tubular sections 42 may have a length between 10.0 cm and 30.0 cm.

In use, as stated above and shown in the Figures, the panel 46 is attached to the pole 36 using clips 56. The pole 36 is extended to a desired length. The bottom surface 18 of the base 12 is attached to the top surface 14 of the vehicle 16 using magnets 24. The device 10 assists a user in identifying the location of the vehicle 16 in a crowded parking lot since the user must merely locate the panel 46 from a distance to determine the vehicle's 16 location. The pole 36 can be swiveled approximately ninety degrees relative to the base 12 to place the pole 36 at a desired angle relative to the base 12. The light emitter 52 assists the user in finding the vehicle 16 in low-light conditions. The tracking chip 22 can also be used to help determine the vehicle's 16 location. The pole 36 can be removed from the top surface 14 of the vehicle 16 and retracted for compact storage of the device 10.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A vehicle location assisting device comprising:

a base configured for positioning on a top surface of a vehicle;

a magnet coupled to said base, said magnet being configured to magnetically attach said base to the top surface of the vehicle;

a pole having a top end and a bottom end, said bottom end of said pole being attached to said base;

a panel coupled to said pole proximate said top end of said pole; and a tracking chip coupled to said base wherein a location of the vehicle is determinable when said base is coupled to the top surface of the vehicle.

2. The device of claim 1, further comprising said magnet being positioned within an interior space of said base.

3. The device of claim 1, further comprising said magnet being one of a plurality of said magnets.

4. The device of claim 1, further comprising said magnet having a convexly arcuate outer edge positioned proximate a perimeter surface of said base and a concavely arcuate inner edge positioned proximate a center of said base.

5. The device of claim 1, further comprising a bottom surface of said base being comprised of a non-slip material.

6. The device of claim 1, further comprising a plurality of clips coupling said panel to said pole.

7. The device of claim 1, further comprising said panel comprising a flag.

8. The device of claim 1, further comprising a swivel connection member coupled to said bottom end of said pole, said swivel connection member coupling said bottom end of said pole to said base such that said pole is selectively swivelable relative to said base.

9. The device of claim 1, further comprising said pole being comprised of a plurality of tubular sections, each of said tubular sections being slidably positionable within an adjacently positioned one of said tubular sections for selectively adjusting a length of said pole.

10. The device of claim 1, further comprising said panel being rigid.

11. The device of claim 1, further comprising indicia being positioned on a front surface of said panel wherein said indicia is configured to assist a user in identifying and locating the vehicle.

12. A vehicle location assisting device comprising:

a base configured for positioning on a top surface of a vehicle;

a magnet coupled to said base, said magnet being configured to magnetically attach said base to the top surface of the vehicle;

a pole having a top end and a bottom end, said bottom end of said pole being attached to said base;

a panel coupled to said pole proximate said top end of said pole;

a plurality of clips coupling said panel to said pole; and a plurality of apertures being positioned in said pole and a plurality of holes being positioned in said panel, each of said apertures corresponding to an associated one of said holes such that each of said clips is extendable through an associated one of said apertures and an associated one of said holes to retain said panel on said pole.

13. The device of claim 6, further comprising said clips releasably coupling said panel to said pole.

14. The device of claim 1, further comprising a light emitter coupled to said pole.

15. The device of claim 14, further comprising said light emitter being coupled to said top end of said pole.

16. The device of claim 14, further comprising a power supply being coupled to said pole, said power supply being electrically coupled to said light emitter for providing power to said light emitter.

17. A vehicle location assisting device comprising:

a base configured for positioning on a top surface of a vehicle, a bottom surface of said base being comprised of a non-slip material;

a tracking chip coupled to said base wherein a location of the vehicle is determinable when said base is coupled to the top surface of the vehicle;

a magnet coupled to said base, said magnet being configured to magnetically attach said base to the top surface of the vehicle, said magnet being positioned within an interior space of said base, said magnet being one of a plurality of said magnets, said magnet having a convexly arcuate outer edge positioned proximate a perimeter surface of said base and a concavely arcuate inner edge positioned proximate a center of said base;

a pole having a top end and a bottom end, said bottom end of said pole being attached to said base, said pole being comprised of a plurality of tubular sections, each of said tubular sections being slidably positionable within an adjacently positioned one of said tubular sections for selectively adjusting a length of said pole;

a swivel connection member coupled to said bottom end of said pole, said swivel connection member coupling said bottom end of said pole to said base such that said pole is selectively swivelable relative to said base;

a panel coupled to said pole proximate said top end of said pole, said panel comprising a flag, said panel being rigid;

indicia being positioned on a front surface of said panel wherein said indicia is configured to assist a user in identifying and locating the vehicle;

a plurality of clips coupling said panel to said pole, said clips releasably coupling said panel to said pole;

a plurality of apertures being positioned in said pole and a plurality of holes being positioned in said panel, each of said apertures corresponding to an associated one of said holes such that each of said clips is extendable through an associated one of said apertures and an associated one of said holes to retain said panel on said pole;

a light emitter coupled to said top end of said pole; and a power supply being coupled to and positioned within said pole, said power supply comprising at least one rechargeable battery, said power supply being electrically coupled to said light emitter for providing power to said light emitter.

* * * * *